US012521875B2

(12) United States Patent
Barry et al.

(10) Patent No.: US 12,521,875 B2
(45) Date of Patent: Jan. 13, 2026

(54) SUPERVISED AUTONOMOUS GRASPING

(71) Applicant: Boston Dynamics, Inc., Waltham, MA (US)

(72) Inventors: Andrew James Barry, Cambridge, MA (US); Alfred Anthony Rizzi, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 489 days.

(21) Appl. No.: 17/644,945

(22) Filed: Dec. 17, 2021

(65) Prior Publication Data

US 2022/0193894 A1 Jun. 23, 2022

Related U.S. Application Data

(60) Provisional application No. 63/128,736, filed on Dec. 21, 2020.

(51) Int. Cl.
*B25J 9/16* (2006.01)
*B25J 13/00* (2006.01)
(52) U.S. Cl.
CPC ............. *B25J 9/163* (2013.01); *B25J 9/1697* (2013.01); *B25J 13/006* (2013.01)
(58) Field of Classification Search
CPC ........ B25J 9/163; B25J 9/1697; B25J 13/006; B25J 9/1612; B25J 9/162; B25J 9/1689;
(Continued)

(56) References Cited

U.S. PATENT DOCUMENTS 6,088,628 A    7/2000  Watanabe et al.
7,714,895 B2   5/2010  Pretlove et al.
(Continued)

FOREIGN PATENT DOCUMENTS

CN    107265355 A    10/2017
CN    107515606 A    12/2017
(Continued)

OTHER PUBLICATIONS

International Search Report and Written Opinion for the related Application No. PCT/US2021/064105, Dated April 4, 2021, 48 pages.
(Continued)

*Primary Examiner* — Tameem D Siddiquee
(74) *Attorney, Agent, or Firm* — Knobbe, Martens, Olson & Bear, LLP

(57) ABSTRACT

A computer-implemented method, executed by data processing hardware of a robot, includes receiving a three-dimensional point cloud of sensor data for a space within an environment about the robot. The method includes receiving a selection input indicating a user-selection of a target object represented in an image corresponding to the space. The target object is for grasping by an end-effector of a robotic manipulator of the robot. The method includes generating a grasp region for the end-effector of the robotic manipulator by projecting a plurality of rays from the selected target object of the image onto the three-dimensional point cloud of sensor data. The method includes determining a grasp geometry for the robotic manipulator to grasp the target object within the grasp region. The method includes instructing the end-effector of the robotic manipulator to grasp the target object within the grasp region based on the grasp geometry.

22 Claims, 6 Drawing Sheets

(58) Field of Classification Search
CPC ........... B25J 13/08; G05B 2219/39443; G05B 2219/39527; G05B 2219/39543; G05B 2219/40532; B62D 57/032; G06N 20/00
See application file for complete search history.

(56) References Cited

U.S. PATENT DOCUMENTS

| | | | |
|---|---|---|---|
| 8,073,564 | B2 | 12/2011 | Bruemmer et al. |
| 9,052,710 | B1 | 6/2015 | Farwell |
| 9,205,887 | B2 | 12/2015 | Darish |
| 9,283,674 | B2 | 3/2016 | Hoffman et al. |
| 9,352,470 | B1 | 5/2016 | Da Silva et al. |
| 9,364,951 | B1 | 6/2016 | De Sapio et al. |
| 9,440,353 | B1 | 9/2016 | Da Silva et al. |
| 9,514,542 | B2 | 12/2016 | Matsumoto et al. |
| 9,536,322 | B1 | 1/2017 | Smith et al. |
| 9,687,983 | B1* | 6/2017 | Prats ................ B25J 9/1612 |
| 9,902,069 | B2 | 2/2018 | Farlow et al. |
| 9,987,744 | B2 | 6/2018 | Prats |
| 10,086,517 | B2 | 10/2018 | Touma et al. |
| 10,166,676 | B1* | 1/2019 | Hudson .............. B25J 9/1612 |
| 10,402,503 | B2 | 9/2019 | Shapiro et al. |
| 10,442,025 | B2 | 10/2019 | Jones et al. |
| 10,816,994 | B2 | 10/2020 | Tian et al. |
| 11,232,635 | B2 | 1/2022 | Brodsky et al. |
| 11,340,620 | B2 | 5/2022 | Seifert et al. |
| 12,325,131 | B2 | 6/2025 | Aghasadeghi et al. |
| 2001/0037163 | A1 | 11/2001 | Allard |
| 2003/0216834 | A1 | 11/2003 | Allard |
| 2005/0104548 | A1 | 5/2005 | Takenaka et al. |
| 2009/0105880 | A1 | 4/2009 | Okazaki |
| 2010/0228397 | A1 | 9/2010 | Weber |
| 2011/0202068 | A1 | 8/2011 | Diolaiti et al. |
| 2012/0072023 | A1 | 3/2012 | Ota et al. |
| 2013/0054029 | A1 | 2/2013 | Huang et al. |
| 2013/0325181 | A1* | 12/2013 | Moore .............. B25J 13/086 901/31 |
| 2014/0222206 | A1 | 8/2014 | Mead et al. |
| 2015/0273689 | A1 | 10/2015 | Ouchi |
| 2015/0321351 | A1 | 11/2015 | Kapoor et al. |
| 2016/0234436 | A1 | 8/2016 | Yu et al. |
| 2016/0260261 | A1 | 9/2016 | Hsu |
| 2017/0203446 | A1 | 7/2017 | Dooley et al. |
| 2017/0217021 | A1 | 8/2017 | Hoffman et al. |
| 2017/0259433 | A1 | 9/2017 | Takeuchi et al. |
| 2017/0275026 | A1* | 9/2017 | Szarski .............. B25J 9/0084 |
| 2017/0326728 | A1 | 11/2017 | Prats |
| 2018/0043543 | A1 | 2/2018 | Buibas et al. |
| 2018/0181274 | A1 | 6/2018 | Jung et al. |
| 2018/0250822 | A1 | 9/2018 | Shimodaira et al. |
| 2018/0297204 | A1 | 10/2018 | Krasny et al. |
| 2018/0348764 | A1 | 12/2018 | Zhang et al. |
| 2019/0026958 | A1 | 1/2019 | Gausebeck et al. |
| 2019/0143517 | A1 | 5/2019 | Yang et al. |
| 2020/0001457 | A1 | 1/2020 | Limone et al. |
| 2020/0019237 | A1 | 1/2020 | Jackson |
| 2020/0039082 | A1 | 2/2020 | Kapoor et al. |
| 2020/0094405 | A1 | 3/2020 | Davidson et al. |
| 2020/0215692 | A1 | 7/2020 | Pivac et al. |
| 2020/0306965 | A1 | 10/2020 | Nakasu et al. |
| 2020/0306998 | A1 | 10/2020 | Talebi et al. |
| 2020/0316782 | A1* | 10/2020 | Chavez .............. G06T 7/55 |
| 2020/0324409 | A1 | 10/2020 | Aguirre et al. |
| 2020/0324412 | A1 | 10/2020 | Whitman et al. |
| 2020/0391385 | A1* | 12/2020 | Oka ................. B25J 9/1666 |
| 2021/0205995 | A1 | 7/2021 | Vu et al. |
| 2021/0291362 | A1 | 9/2021 | Pivac |
| 2021/0293099 | A1* | 9/2021 | Carnegie ............. E21B 15/00 |
| 2021/0339390 | A1 | 11/2021 | Gaschler |
| 2022/0032454 | A1* | 2/2022 | Yang ............... G06V 10/764 |
| 2022/0193898 | A1 | 6/2022 | Aghasadeghi et al. |
| 2022/0193906 | A1 | 6/2022 | Barry et al. |
| 2022/0244741 | A1 | 8/2022 | da Silva et al. |
| 2022/0260998 | A1 | 8/2022 | Seifert et al. |
| 2023/0234229 | A1 | 7/2023 | Fay et al. |
| 2023/0286161 | A1 | 9/2023 | Dellon |
| 2024/0061436 | A1 | 2/2024 | Tsuzaki et al. |
| 2025/0196339 | A1 | 6/2025 | Aghasadeghi et al. |

FOREIGN PATENT DOCUMENTS

| | | |
|---|---|---|
| CN | 105488457 B | 4/2019 |
| CN | 109682381 B | 9/2020 |
| GB | 2598345 A | 3/2022 |
| JP | 2003136455 A | 5/2003 |
| JP | 2014087892 A | 5/2014 |
| KR | 20090113084 A | 10/2009 |
| KR | 20130000496 A | 1/2013 |
| KR | 20140040094 A | 4/2014 |
| WO | WO 2010/136961 A1 | 12/2010 |
| WO | WO 2011/146259 A2 | 11/2011 |
| WO | WO 2020/190166 A1 | 9/2020 |
| WO | WO 2021/015868 A1 | 1/2021 |
| WO | WO 2021/025715 A1 | 2/2021 |
| WO | WO 2022/140151 A1 | 6/2022 |
| WO | WO 2022/140190 A1 | 6/2022 |
| WO | WO 2022/140205 A1 | 6/2022 |
| WO | WO 2023/140929 A1 | 7/2023 |
| WO | WO 2023/172385 A1 | 9/2023 |

OTHER PUBLICATIONS

International Search Report and Written Opinion dated Apr. 12, 2022 for related Application No. PCT/US2021/064236 in 22 pages.
Nair et al., "Overcoming Exploration in Reinforcement Learning with Demonstrations", In 2018 IEEE international Conference on Robotics and Automation (ICRA) May 2, 20181 (pp. 6292-6299).
Skrynnik et al., "Forgetful Experience Replay in Hierarchical Reinforcement Learning from Demonstrations", arXiv preprint arXiv:2006.09939. Jun. 17, 2020; 18 pages.
International Search Report and Written Opinion dated Mar. 25, 2022 for corresponding International Application No. PCT/US2021/063776; 10 pages.
International Search Report and Written Opinion dated Mar. 23, 2023 in Application No. PCT/US2022/051066, 9 pages.
Beetz et al., "Towards Performing Everyday Manipulation Activities". Robotics and Autonomous Systems. Sep. 30, 2010;58(9):1085-1095.
Klamt et al., "Supervised Autonomous Locomotion and Manipulation for Disaster Response with a Centour-like Robot". In 2018 IEEE/RSJ International Conference on Intelligent Robots and Systems (IROS) Oct. 1, 2018 (pp. 1-8).
Mittal et al., "Articulated Object Interaction in Unknown Scenes with Whole-Body Mobile Manipulation". In 2022 IEEE/RSJ Inter'l Conf Intel Robots and Syst. (IROS) Oct. 2, 20223 (pp. 1647-1654).
Rusu R.B., "Semantic 3D Object Maps for Everyday Manipulation in Human Living Environments Dissertation". KI-Künstliche Intelligenz. Nov. 2010;24:345-348.
Zhu et al., "A Robotic Semantic Grasping Method for Pick-and-place Tasks". In 2019 Chinese Automation Congress (CAC) Nov. 22, 2019 (pp. 4130-4136); IEEE.
International Search Report and Written Opinion dated Mar. 27, 2025 in Application No. PCT/US2024/059801, 13 pages.
"Anybotics Introduces End-to-End Robotic Inspection Solution," video screen shots taken from https://www.youtube.com/watch?v=g3odef0EAFA, Apr. 21, 2021, downloaded Apr. 3, 2025, 16 pages.
"ANYmal Robots Inspecting PETRONAS' Offshore Platform (Webinar)," video screen shots taken from https://www.youtube.com/watch?v=aymdpFsdgbA, Jan. 22, 2021, downloaded Apr. 9, 2025, 19 pages.
"ANYmal X—Robotic Inspection in Ex-Rated Zones," video screen shots taken from https://vimeo.com/744482989, Aug. 30, 2022, downloaded Apr. 9, 2025, 13 pages.
"ANYmal @ ERL Emergency Robotics 2017," video screen shots taken from https://www.youtube.com/watch?v=qrJIMze_xhQ, Oct. 2, 2017, downloaded Apr. 9, 2025, 4 pages.
Anonymous, "Anybotics Introduces End-to-End Robotic Inspection Solution,"https://www.anybotics.com/news/anybotics-introduces-end-to-end-robotic-inspection-solution/, Apr. 21, 2021, printed Apr. 9, 2025, 11 pages.

(56) References Cited

OTHER PUBLICATIONS

Anonymous, "Guide to Industrial Inspection Robots: Identifying the Task you Want to Automate,"https://www.anybotics.com/news/how-to-hire-an-industrial-inspection-robot-part-1/, Mar. 21, 2023, printed Apr. 9, 2025, 15 pages.

Anonymous, "Anybotics, Cognite & Accenture Enable Real End-to-End Robotic InspectionSolutions," https://www.anybotics.com/news/anybotics-cognite-accenture-enable-real-end-to-end-robotic-inspection-solutions/, May 30, 2022, printed Apr. 9, 2025, 13 pages.

Dellon, et al., "Feedback Distortion to Augment Controllability of Human Limb Motion," VirtualRehabilitation, 2008, 6 pages, https://neurobotics.cs.washington.edu/papers/3-VR2008FeedbackDistortion.pdf.

Delmerico et al., "Spatial Computing and Intuitive Interaction: Bringing Mixed Reality and Robotics Together." IEEE Robotics & Automation Magazine. Jan. 14, 2022;29(1):45-57.

Fadelli I., "Researchers Enhance Human-Robot Interaction by Merging Mixed Reality and Robotics." Tech Xplore, Mar. 3, 2022; downloaded from https://techxplore.com/news/2022-03-human-robot-interaction-merging-reality-robotics.amp; 7 pages.

McCoy, et al., "Virtual Sensorimotor Balance Training for Children With Fetal Alcohol SpectrumDisorders: Feasibility Study," Physical Therapy, Nov. 2015, 13 pages, https://doi.org/10.2522/ptj.20150124.

Uzunovic et al., Novel Algorithm for Position/Force Control of multi-DOF robotic systems. In 2020 IEEE 16th International Workshop on Advanced Motion Control (AMC) Sep. 14, 2020 (pp. 273-278).

International Search Report and Written Opinion dated Feb. 3, 2020 for Application No. PCT/US2019/057586, 9 pages.

International Search Report and Written Opinion dated May 24, 2023 in Application No. PCT/US2023/013195, 16 pages.

\* cited by examiner

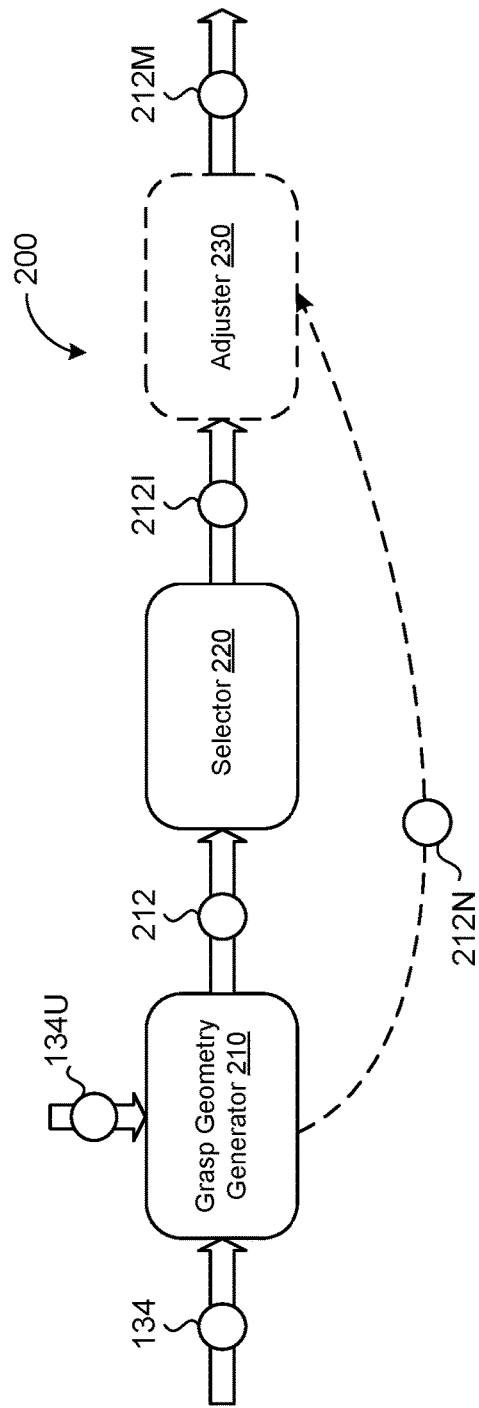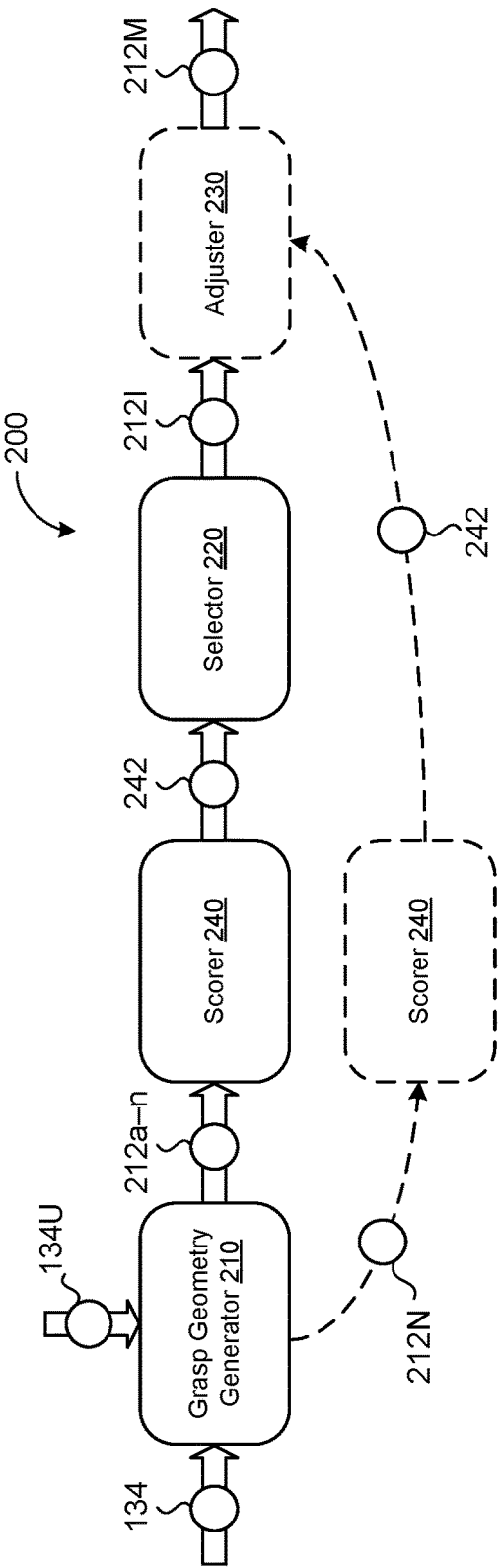
FIG. 2A
FIG. 2B

500

```
┌─────────────────────────────────────────────┐
│ RECEIVING A THREE-DIMENSIONAL POINT CLOUD OF│
│ SENSOR DATA FOR AN AREA WITHIN AN ENVIRONMENT│
│            ABOUT THE ROBOT                  │
│                                         502 │
└─────────────────────────────────────────────┘
                      ↓
┌─────────────────────────────────────────────┐
│     RECEIVING A USER INPUT SELECTING A TARGET│
│ OBJECT REPRESENTED IN AN IMAGE CORRESPONDING │
│                TO THE AREA                  │
│                                         504 │
└─────────────────────────────────────────────┘
                      ↓
┌─────────────────────────────────────────────┐
│ GENERATING A GRASP AREA FOR THE END-EFFECTOR│
│ BY PROJECTING A PLURALITY OF RAYS FROM THE  │
│ TARGET OBJECT OF THE IMAGE ONTO THE THREE-  │
│         DIMENSIONAL POINT CLOUD             │
│                                         506 │
└─────────────────────────────────────────────┘
                      ↓
┌─────────────────────────────────────────────┐
│ DETERMINING A GRASP GEOMETRY FOR THE ROBOTIC│
│ MANIPULATOR TO GRASP THE TARGET OBJECT WITHIN│
│              THE GRASP AREA                 │
│                                         508 │
└─────────────────────────────────────────────┘
                      ↓
┌─────────────────────────────────────────────┐
│  INSTRUCTING THE END-EFFECTOR TO GRASP THE  │
│ TARGET OBJECT WITHIN THE GRASP AREA BASED ON│
│             THE GRASP GEOMETRY              │
│                                         510 │
└─────────────────────────────────────────────┘
```

FIG. 3

SUPERVISED AUTONOMOUS GRASPING

CROSS REFERENCE TO RELATED APPLICATIONS

This U.S. patent application claims priority under 35 U.S.C. § 119(e) to U.S. Provisional Application 63/128,736, filed on Dec. 21, 2020. The disclosure of this prior application is considered part of the disclosure of this application and is hereby incorporated by reference in its entirety.

TECHNICAL FIELD

This disclosure relates to supervised autonomous grasping.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to program robots in a quick and an efficient manner for various behaviors provides additional benefits to such industries.

SUMMARY

An aspect of the disclosure provides a computer-implemented method that when executed by data processing hardware of a robot causes the data processing hardware to perform operations. The operations include receiving a three-dimensional point cloud of sensor data for a space (e.g., a volume) within an environment about the robot. The operations further include receiving a selection input indicating a user-selection of a target object represented in an image corresponding to the space. The target object is for grasping by an end-effector of a robotic manipulator of the robot. The operations also include generating a grasp region for the end-effector of the robotic manipulator by projecting a plurality of rays from the selected target object of the image onto the three-dimensional point cloud of sensor data. Additionally, the operations include determining a grasp geometry for the robotic manipulator to grasp the target object within the grasp region. Furthermore, the operations include instructing the end-effector of the robotic manipulator to grasp the target object within the grasp region based on the grasp geometry.

Aspects of the disclosure may provide one or more of the following optional features. In some implementations, determining the grasp geometry for the robotic manipulator to grasp the target object within the grasp region includes generating a plurality of candidate grasp geometries based on the target object within the grasp region. In these implementations, determining the grasp geometry for the robotic manipulator to grasp the target object within the grasp region further includes, for each candidate grasp geometry of the plurality of candidate grasp geometries, determining a grasping score for grasping the target object. The grasping score indicates a likelihood of success for grasping the target object using the end-effector of the robotic manipulator based on the respective candidate grasp geometry. In these implementations, determining the grasp geometry for the robotic manipulator to grasp the target object within the grasp region further includes selecting the respective candidate grasp geometry with a greatest grasping score as an initial grasping geometry designated to grasp the target object. The initial grasping geometry is based on an initial pose for the end-effector of the robotic manipulator. In further implementations, the operations include receiving updated sensor data for a second pose of the end-effector of the robotic manipulator. In these further implementations, the operations include determining a new set of candidate grasping geometries based on the updated sensor data. Each candidate grasping geometry of the new set of candidate grasping geometries includes a respective grasping score. In these further implementations, the operations include determining that a respective candidate grasp geometry from the new set of candidate grasping geometries includes a corresponding grasping score that exceeds the grasping score of the initial grasping geometry. In these further implementations, the operations include modifying the initial grasping geometry based on the respective candidate grasp geometry from the new set of candidate grasping geometries.

In some embodiments, the operations further include receiving an end-effector constraint constraining one or more degrees of freedom for the end-effector of the robotic manipulator to grasp the target object. In some implementations, the target object represented in the image corresponding to the space corresponds to an object classified by a machine learning algorithm.

In some examples, the operations include receiving the image corresponding to the space. In these examples, the operations include classifying graspable objects within the received image using a machine learning object classification algorithm. In some implementations, instructing the end-effector of the robotic manipulator to grasp the target object within the grasp region based on the grasp geometry includes instructing a body of the robot to pitch toward the target object, or instructing a first leg of the robot to rotate an upper member of the first leg about a knee joint towards a lower member of the first leg.

In some embodiments, receiving the selection input selecting the target object represented in the image corresponding to the space occurs at a user device in remote communication with the data processing hardware of the robot. In some examples, the operations include receiving the image corresponding to the space and calibrating the received image. In some implementations, the end-effector includes a gripper having a movable jaw and a fixed jaw. The movable jaw is configured to move relative to the fixed jaw to move between an open position for the gripper and a closed position for the gripper. In some embodiments, the robotic manipulator includes one or more sensors mounted at or near the end-effector to capture the sensor data defining the three-dimensional point cloud for the space within the environment about the robot.

Another aspect of the disclosure provides a robot. The robot includes a body, a plurality of legs coupled to the body, a robotic manipulator coupled to the body, data processing hardware in communication with the robotic manipulator, and memory hardware in communication with the data processing hardware. The robotic manipulator includes an end-effector configured to grasp objects within an environment about the robot. The memory hardware stores instructions that when executed on the data processing hardware cause the data processing hardware to perform operations.

The operations include receiving a three-dimensional point cloud of sensor data for a space within the environment about the robot. The operations also include receiving, from a user of the robot, a selection input indicating a user-selection of a target object represented in an image corresponding to the space. The target object is for grasping by the end-effector of the robotic manipulator. Additionally, the operations include generating a grasp region for the end-effector of the robotic manipulator by projecting a plurality of rays from the selected target object of the image onto the three-dimensional point cloud of sensor data. Furthermore, the operations include determining a grasp geometry for the robotic manipulator to grasp the target object within the grasp region. The operations further include instructing the end-effector of the robotic manipulator to grasp the target object within the grasp region based on the grasp geometry.

Aspects of the disclosure may provide one or more of the following optional features. In some embodiments, determining the grasp geometry for the robotic manipulator to grasp the target object within the grasp region includes generating a plurality of candidate grasp geometries based on the target object within the grasp region. In these embodiments, for each candidate grasp geometry of the plurality of candidate grasp geometries, determining the grasp geometry for the robotic manipulator to grasp the target object within the grasp region further includes determining a grasping score for grasping the target object. The grasping score indicates a likelihood of success for grasping the target object using the end-effector of the robotic manipulator based on the respective candidate grasp geometry. In these embodiments, determining the grasp geometry for the robotic manipulator to grasp the target object within the grasp region also includes selecting the respective candidate grasp geometry with a greatest grasping score as an initial grasping geometry designated to grasp the target object. The initial grasping geometry is based on an initial pose for the end-effector of the robotic manipulator. In further embodiments, the operations further include receiving updated sensor data for a second pose of the end-effector of the robotic manipulator. In these further embodiments, the operations include determining a new set of candidate grasping geometries based on the updated sensor data. Each candidate grasping geometry of the new set of candidate grasping geometries includes a respective grasping score. In these further embodiments, the operations include determining that a respective candidate grasp geometry from the new set of candidate grasping geometries includes a corresponding grasping score that exceeds the grasping score of the initial grasping geometry. In these further embodiments, the operations include modifying the initial grasping geometry based on the respective candidate grasp geometry from the new set of candidate grasping geometries.

In some implementations, the operations further include receiving an end-effector constraint constraining one or more degrees of freedom for the end-effector of the robotic manipulator to grasp the target object. In some examples, the target object represented in the image corresponding to the space corresponds to an object classified by a machine learning algorithm. In some embodiments, the operations further include receiving the image corresponding to the space. In these embodiments, the operations include classifying graspable objects within the receive image using a machine learning object classification algorithm.

In some examples, instructing the end-effector of the robotic manipulator to grasp the target object within the grasp region based on the grasp geometry includes instructing a body of the robot to pitch toward the target object or instructing a first leg of the robot to rotate an upper member of the first leg about a knee joint towards a lower member of the first leg. In some implementations, receiving the selection input selecting the target object represented in the image corresponding to the space occurs at a user device in remote communication with the data processing hardware of the robot. In some embodiments, the operations further include receiving the image corresponding to the space and calibrating the received image. In some examples, the end-effector includes a gripper having a movable jaw and a fixed jaw. The movable jaw is configured to move relative to the fixed jaw to move between an open position for the gripper and a closed position for the gripper. In some implementations, the robotic manipulator includes one or more sensors mounted at or near the end-effector to capture the sensor data defining the three-dimensional point cloud for the space within the environment about the robot.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2C are schematic views of example grasping systems for the robot of FIG. 1A.

FIG. 3 is a flowchart of an example arrangement of operations for a method of supervised autonomous grasping.

Like reference symbols in the various drawings indicate like elements.

DETAILED DESCRIPTION

Figure 1A:
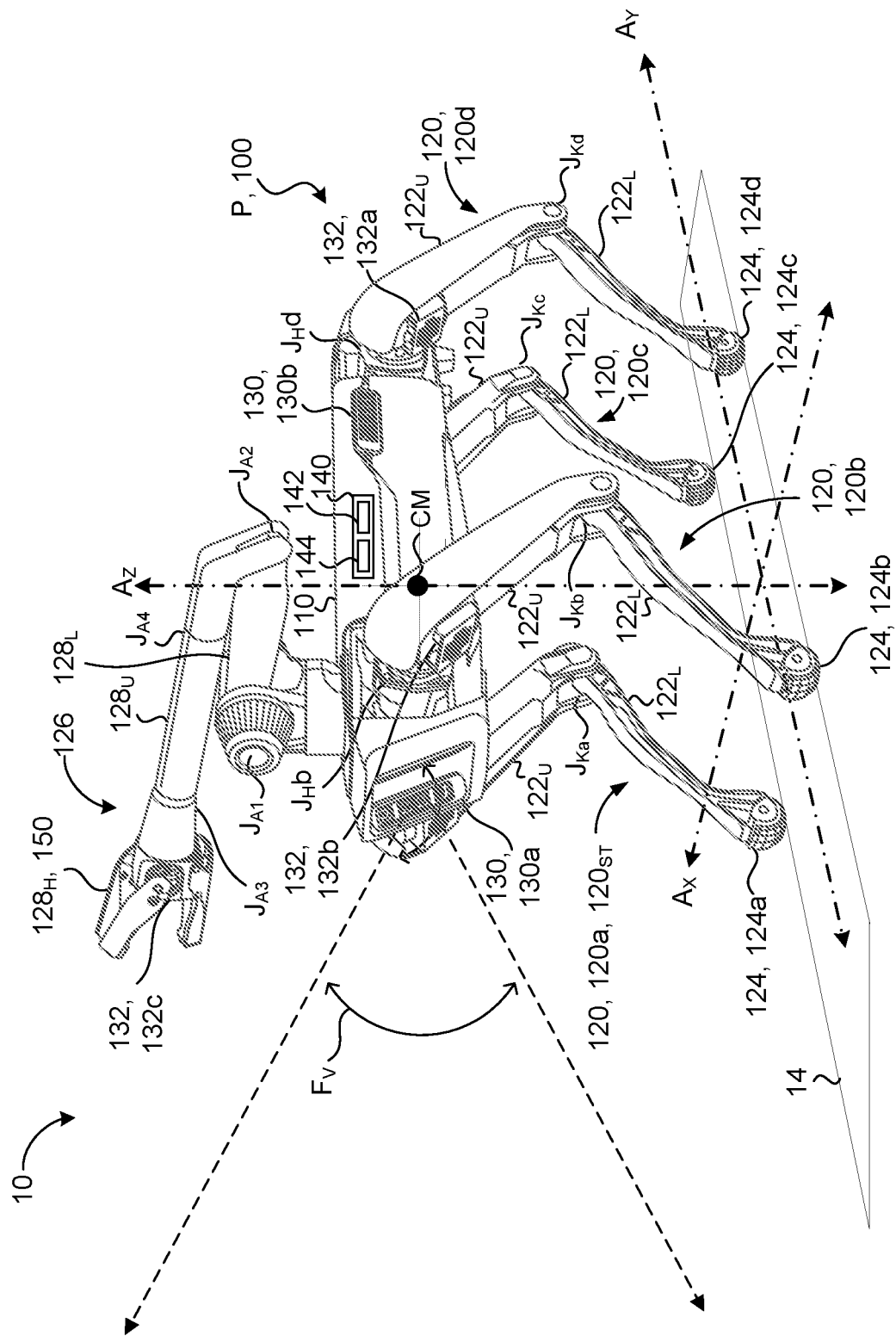
FIG. 1A is a perspective view of an example robot capable of grasping an object.
Figure 1B:
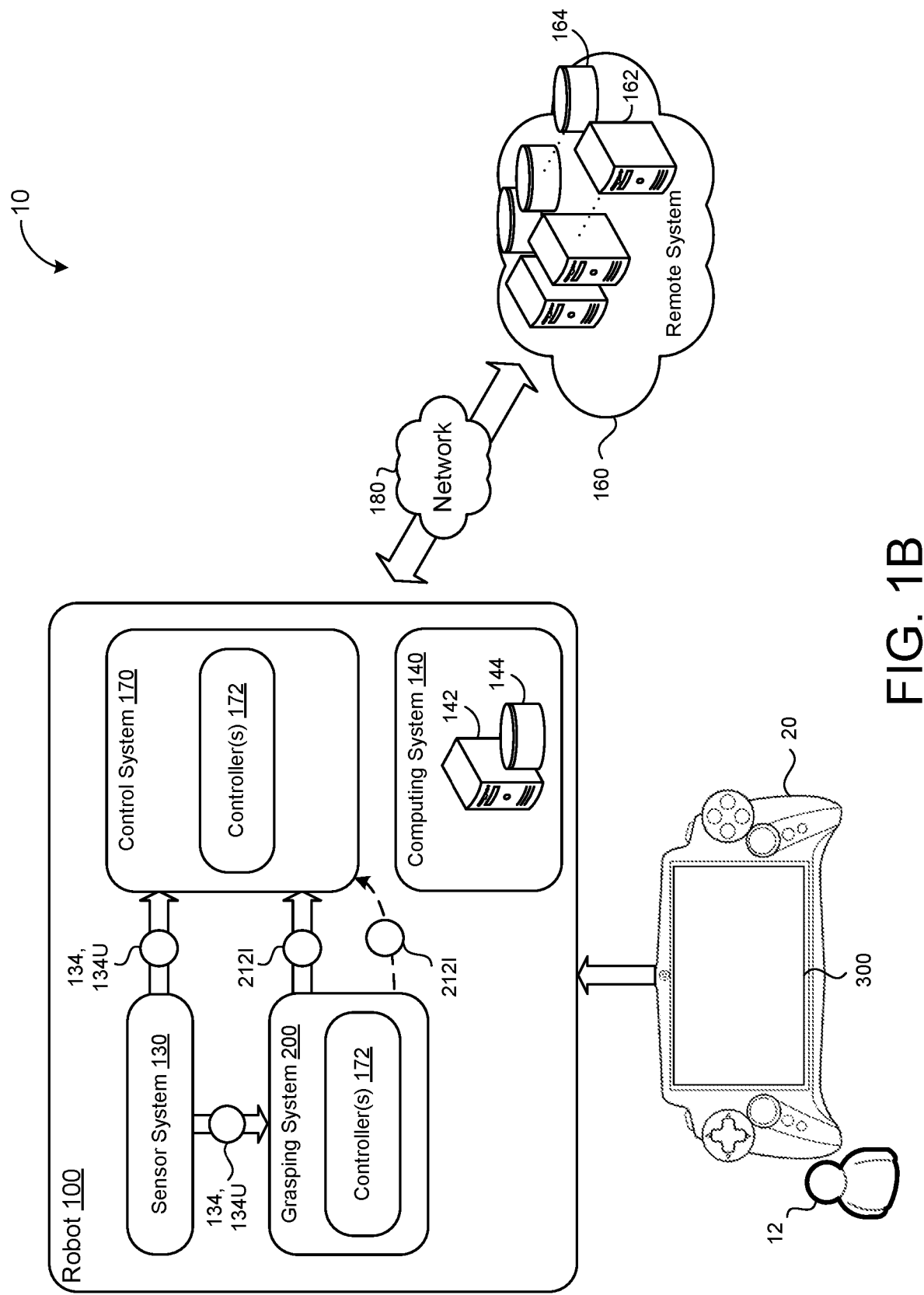
FIG. 1B is a schematic view of example systems of the robot of FIG. 1A.

Referring to FIGS. 1A and 1B, the robot 100 includes a body 110 with locomotion based structures such as legs 120a-d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 10.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 10 (e.g., objects within the environment 10). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., shown as an end-effector 150). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ or end-effector 150 is a mechanical gripper that includes a moveable jaw and a fixed jaw configured to perform different types of grasping of elements within the environment 10. The moveable jaw is configured to move relative to the fixed jaw in order to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 10 or to perform tasks using the arm 126, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. The sensor system 130 may generate the field of view $F_V$ with a sensor 132 mounted on or near the body 110 of the robot 100 (e.g., sensor(s) 132a, 132b). The sensor system may additionally and/or alternatively generate the field of view $F_V$ with a sensor 132 mounted at or near the end-effector 150 of the arm 126 (e.g., sensor(s) 132c). The one or more sensors 132 may capture sensor data 134 that defines the three-dimensional point cloud for the area within the environment 10 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 10 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member 126H relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, grasping system 200, and/or remote controller 20). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 180 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170. The control system 170 may be configured to communicate with systems of the robot 100, such as the at least one sensor system 130. The control system 170 may perform operations and other functions using hardware 140. The control system 170 includes at least one controller 172 that is configured to control the robot 100. For example, the controller 172 controls movement of the robot 100 to traverse about the environment 10 based on input or feedback from the systems of the robot 100 (e.g., the sensor system 130, the control system 170, and/or the grasping system 200). In additional examples, the controller 172 controls movement between poses and/or behaviors of the robot 100. At least one the controller 172 may be responsible for controlling movement of the arm 126 of the robot 100 in order for the arm 126 to perform various tasks using the end-effector 150. For instance, at least one controller 172 controls the end-effector 150 (e.g., gripper) to manipulate an object or element in the environment 10. For example, the controller 172 actuates the movable jaw in a direction towards the fixed jaw to close the gripper. In other examples, the controller 172 actuates the movable jaw in a direction away from the fixed jaw to open the gripper.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120a-b, four legs 120a-d, or two legs 120a-b combined with the arm 126.

Referring now to FIG. 1B, the sensor system 130 of the robot 100 generates a three-dimensional point cloud of sensor data 134 for an area or space or volume within the environment 10 about the robot 100. Although referred to as a three-dimensional point cloud of sensor data 134, it should be understood that the sensor data 134 may represent a three-dimensional portion of the environment 10 or a two-dimensional portion (such as a surface or plane) of the environment 10. In other words, the sensor data 134 may be a three-dimensional point cloud or a two-dimensional collection of points. The sensor data 134 corresponds to the current field of view $F_V$ of the one or more sensors 132 mounted on the robot 100. In some examples, the sensor system 130 generates the field of view $F_V$ with the one or more sensors 132c mounted at or near the end-effector 150. In other examples, the sensor system 130 additionally and/or alternatively generates the field of view $F_V$ based on the one or more sensors 132a, 132b mounted at or near the body 110 of the robot 100. The sensor data 134 updates as the robot 100 maneuvers within the environment 10 and the one or more sensors 132 are subject to different field of views $F_V$. The sensor system 130 sends the sensor data 134 to the control system 170, grasping system 200, and/or remote controller 20.

A user 12 may interact with the robot 100 via the remote controller 20 that communicates with the robot 100 to perform actions. Additionally, the robot 100 may communicate with the remote controller 20 to display an image on a user interface 300 (e.g., UI 300) of the remote controller 20. The UI 300 is configured to display the image that corresponds to three-dimensional field of view $F_V$ of the one or more sensors 132 or to toggle between sensors 132 in order to display different images corresponding to a respective field of views $F_V$ for a given sensor 132. The image displayed on the UI 300 of the remote controller 20 is a two-dimensional image that corresponds to the three-dimensional point cloud of sensor data 134 (e.g., field of view $F_V$) for the area within the environment 10 about the robot 100. That is, the image displayed on the UI 300 is a two-dimensional image representation that corresponds to the three-dimensional field of view $F_V$ of the one or more sensors 132.

The image displayed on the UI 300 may include one or more objects that are present in the environment 10 (e.g., within a field of view $F_V$ for a sensor 132 of the robot 100). In some examples, the grasping system 200 or some other system of the robot 100 may be configured to classify an image in order to identify one or more objects within the image (e.g., to identify one or more graspable objects). In some implementations, the image is classified by a machine learning algorithm in order to identify the presence of one or more graspable objects in the image that correspond to one or more graspable objects within a portion of the environment 10 corresponding to the image. In particular, the sensor system 130 receives the image that corresponds to the area (e.g., environment 10) and sends the image (e.g., sensor data 134) to the grasping system 200. The grasping system 200 classifies graspable objects within the received image (e.g., sensor data 134) using a machine learning object classification algorithm. For example, the grasping system 200 may classify a piece of clothing on the ground as "laundry," or a piece of trash on the ground as "trash." The classification of the objects in the image may display to the user 12 on the UI 300. The UI 300 may further calibrate the received image to display for the user 12. The UI 300 allows the user 12 to select an object displayed in the two-dimensional image as a target object in order to instruct the robot 100 to perform an action upon the selected target object in the three-dimensional environment 10.

In some implementations, the target object selected by the user corresponds to a respective object for an end-effector 150 of a robotic manipulator of the robot 100 to grasp. For example, the sensor system 130 of a robot 100 in a manufacturing environment 10 generates a three-dimensional point cloud of sensor data 134 for an area within the manufacturing environment 10. The UI 300 displays the two-dimensional image that corresponds to the three-dimensional point cloud of sensor data 134 within the manufacturing environment 10. The user 12 may instruct the robot 100 to grasp a target object (e.g., a valve) within the manufacturing environment 10 by selecting the target object (e.g., valve) on the UI 300. The remote controller 20 sends the selected target object to the robot 100 to execute the grasp on the target object.

The grasping system 200 receives the user-selected target object and sensor data 134. From the user-selected target object and sensor data 134, the grasping system 200 identifies an area or region within the three-dimensional environment 10 where the target object is located. For instance, the grasping system 200 generates a grasp area or grasp region corresponding to the area within the three-dimensional environment 10 where the target object is actually located in to order designate where the end-effector 150 is to grasp the target object. In particular, the grasping system 200 transforms the user-selected target object from the two-dimensional image to the grasp area on the three-dimensional point cloud of sensor data 134. By generating the grasp area, the grasping system 200 allows the selected target object from the two-dimensional image to instruct the robot 100 to grasp the target object in the three-dimensional environment 10. In some configurations, the grasping system 200 generates the grasp area by projecting a plurality of rays from the selected target object of the image onto the three-dimensional point cloud of sensor data 134, as discussed in more detail below in FIG. 2C. After determining the grasp area, the grasping system 200 determines a grasp geometry 212 for the robotic manipulator (i.e., the arm 126 of the robot 100) to grasp the target object with. The grasp geometry 212 indicates the pose of the end-effector 150 of the robotic manipulator, where the pose represents the translation (e.g., x-coordinate, y-coordinate, and z-coordinate) and orientation (e.g., pitch, yaw, and roll) of the end-effector 150. That is, the grasp geometry 212 indicates the pose (e.g., orientation and translation) that the end-effector 150 of the robotic manipulator uses to grasp the target object.

The grasping system 200 sends an initial grasp geometry 212I to one or more controllers 172 that instruct the robot 100 to execute the grasp geometry 212 on the target object. In some implementations, the grasping system 200 includes one or more dedicated controllers 172 to instruct the robot 100 to execute the grasp geometry 212. In other implementations, the grasping system 200 sends the grasp geometry 212 to one or more controllers 172 of the control system 170 that instruct the robot 100 to execute the grasp geometry 212.

Referring now to FIG. 2A, in some implementations, the grasping system 200 determines the grasp geometry 212 for the end-effector 150 of the robotic manipulator to grasp the targeted object selected by the user 12. That is, the grasping system 200 determines the pose (e.g., orientation and translation) of the end-effector 150 of the robotic manipulator to grasp the target object. The grasping system 200 may include a grasp geometry generator 210 and a selector 220 to determine the grasp geometry 212. The grasp geometry generator 210 receives sensor data 134 from the sensor system 130. The grasp geometry generator 210 is configured to generate the grasp geometry 212 for the end-effector 150 of the robotic manipulator to grasp the selected target object based on the grasp area and sensor data 134. In particular, the grasp geometry generator 210 receives the selected target object and the sensor data 134 to generate the grasp area. Based on the grasp area, the grasp geometry generator 210 determines the grasp geometry 212 (e.g., orientation and translation) of the end-effector 150 to grasp the target object. The grasp geometry generator 210 sends the grasp geometry 212 to the selector 220. The selector 220 is configured to implement the grasp geometry 212 received from the grasp geometry generator 210. In particular, the selector 220 sends the initial grasp geometry 212I to the control system 170. The control system 170 instructs the robot 100 to begin execution of the initial grasp geometry 212I to grasp the selected target object.

In some implementations, the user 12 may input an end-effector constraint at the remote controller 20 where the end-effector constraint constrains one or more degrees of freedom of the end-effector 150. The degrees of freedom may include translation (e.g., x-coordinate, y-coordinate, and z-coordinate) and/or orientation (e.g., pitch, roll, and yaw) of the end-effector 150. In other words, the end-effector 150 may have six degrees of freedom where three of the degrees relate to translation and three relate to orientation. The user 12 may instruct the end-effector 150 to grasp the target object with a grasp geometry 212 that includes the end-effector constraint in order to constrain a degree of freedom for the end-effector 150. For example, the user 12 may instruct the robot 100 to grasp the target object with a pitch of ninety degrees. In this example, the grasping system 200 can generate any grasp geometry that includes a pitch of ninety degrees. In another example, the user 12 instructs the robot 100 to grasp the target object with a grasp geometry 212 that includes a specific height (e.g., z-coordinate). Thus, the grasp geometry generator 210 can generate a grasp geometry 212 that includes the user-selected z-coordinate. The user 12 may include any number of end-effector constraints to constrain the end-effector 150 when grasping the target object. For instance, combining both examples, the user 12 may input end-effector 150 constraints for both pitch and the z-coordinate (e.g., when assigning the target object for the end-effector 150 to grasp). The end-effector constraint allows the user 12 to customize any number of degrees of freedom for the end-effector 150 to grasp the target object.

In some implementations, after the robot 100 begins to execute the initial grasp geometry 212I, the grasping system 200 may determine a new grasp geometry 212N to grasp the target object. The grasping system 200 may determine, after the robot 100 begins execution of the initial grasp geometry 212I, a new grasp geometry 212N that improves and/or refines the grasp geometry 212 being executed. Here, an improvement or refinement in the grasp geometry 212 may correspond to a grasp geometry 212 that is more efficient (e.g., a more cost effective grasp in terms of energy or motion), has a higher likelihood of success, has a more optimal execution time (e.g., faster or slower), etc., to grasp the target object when compared to the initial grasp geometry 212I. The grasping system 200 may generate the new grasp geometry 212N based on updated sensor data 134U that represents the changing field of view $F_V$ for one or more sensors 132 as the robot 100 maneuvers within the environment 10 to grasp the target object. That is, as the robot 100 maneuvers within the environment 10 to execute the initial grasp geometry 212I to grasp the target object, the one or more sensors 132 capture the changing field of view $F_V$ within the environment 10. Based on the changing field of view $F_V$ (e.g., updated sensor data 134U) the grasping system determines the new grasp geometry 212N. For example, a sensor 132 of the robot 100 (e.g., a sensor 132 mounted on or near the end-effector 150) may generate sensor data 134 at some sensing frequency. Thus, while the robot 100 moves to execute the initial grasp geometry 212I, the sensor 132 may move and may generate new sensor data 134 (referred to as "updated sensor data 134U") at the sensing frequency that inherently may include new information that is capable of improving or refining the initial grasp geometry 212I. The grasping system 200 may therefore leverage this updated sensor data 134U as the grasp by the end-effector 150 is being performed according to the initial grasp geometry 212I to update or to modify the initial grasp geometry 212I; thus leading to a continuous or periodic feedback loop that ensures that the target object is optimally grasped.

As an example, while the end-effector 150 of the robotic manipulator moves to execute the initial grasp geometry 212I, the sensor system 130 receives updated sensor data 134U that indicates a foreign object near the target object. In particular, as the end-effector 150 maneuvers within the environment 10, the sensor 132c has a field of view $F_V$ within the environment 10 that is different than the field of view $F_V$ before the robot 100 began execution of the initial grasp geometry 212I (i.e., an initial field of view $F_V$ when the initial grasp geometry 212I was generated). In this example, the foreign object was outside the field of view $F_V$ of the sensor system 130 before the robot 100 began execution of the initial grasp geometry 212I. Because the foreign object was outside the field of view $F_V$, the sensor system 130 did not represent the foreign object in the sensor data 134 sent to the grasp geometry generator 210. Thus, the grasp geometry generator 210 may generate an initial grasp geometry 212I that failed to account for the foreign object (e.g., an obstruction by the foreign object) because the sensor data 134 sent to the grasp geometry generator 210 did not indicate any foreign objects near the target object. Without any knowledge of the foreign object, if the robot 100 executed the initial grasp geometry 212I, the foreign object may prevent the end-effector 150 from successfully grasping the target object. In this example, the robot 100 may modify the initial grasp geometry 212I based on the updated sensor data 134U (e.g., the sensor data 134U that includes the foreign object) to successfully grasp the target object.

In some implementations, during the time period between when the end-effector 150 of the robotic manipulator starts executing the grasp geometry 212 and before completing the execution of the grasp geometry 212 on the target object, the sensor system 130 receives updated sensor data 134U. That is, while the end-effector 150 of the robotic manipulator moves to execute the initial grasp geometry 212I on the target object, the sensor system 130 receives updated sensor data 134U. The updated sensor data 134U represents the updated field of view $F_V$ as the robot 100 moves within the environment 10 to grasp the target object. In particular, the updated sensor data 134U may provide additional information (e.g., a foreign object at or near the target object) to the grasping system 200 that was not available before the grasping system 200 determined the initial grasp geometry 212I. For example, the sensor system 130 of the robot 100 receives sensor data 134 that represents the current field of view $F_V$ of the robot 100, after the robot 100 begins to execute the grasp geometry 212 the sensor system 130 of the robot 100 receives updated sensor data 134U as the robot 100 moves to execute the grasp. In some examples, the grasping system 200 may modify the grasp geometry 212 based on the updated sensor data 134U (e.g., the updated sensor data 134U indicates a foreign object that prevents the robot 100 from grasping the target object). In other examples, the grasping system 200 may continue to execute the initial grasp geometry 212I after receiving the updated sensor data 134U (e.g., the updated sensor data 134U indicates the same or substantially similar data as the initial sensor data 134). In this sense, the grasping system 200 may review the validity of the initial grasp geometry 212I using sensor data 134 provided to the grasping system 200 after the grasping system 200 generates the initial grasp geometry 212I. Upon review of the initial grasp geometry 212I based on the received updated sensor data 134U, the robot 100 may continue to execute the initial grasp geometry 212I (e.g., the initial grasp geometry 212I is still optimal when compared to other candidate grasp geometries 212 generated using the updated sensor data 134U), modify the initial grasp geometry 212I, or completely switch to an alternative grasp geometry 212.

Optionally, the grasping system 200 may include an adjuster 230. The adjuster 230 is indicated by dashed lines because the adjuster 230 is an optional component of the grasping system 200. The adjuster 230 is configured to determine whether to adjust the initial grasp geometry 212I after the end-effector 150 of the robotic manipulator begins to execute the initial grasp geometry 212I. As the robot 100 executes the initial grasp geometry 212I, the grasp geometry generator 210 receives updated sensor data 134U from the one or more sensors 132. Based on the updated sensor data 134U the grasp geometry generator 210 generates a new candidate grasp geometry 212N. The grasp geometry generator 210 sends the new candidate grasp geometry 212N to the adjuster 230. The adjuster 230 may also receive the initial grasp geometry 212I from the selector 220. The adjuster 230 determines whether to modify the initial grasp geometry 212I based on the new grasp geometry 212N and updated sensor data 134U. That is, after beginning execution of the initial grasp geometry 212I, the adjuster 230 receives the new candidate grasp geometry 212N and the updated sensor data 134U. In other words, the grasping system 200 generated the initial grasp geometry 212I using sensor data 134 at a first instance of time (e.g., when the user 12 selects the target object for the end-effector 150 to grasp) and then, the grasping system 200 generates one or more new candidate grasp geometries 212N using the updated sensor data 134U at a second instance of time subsequent to the first instance of time (e.g., when the robotic manipulator and/or end-effector 150 is executing a grasp of the target object). Based on the updated sensor data 134U, the adjuster 230 determines whether to continue execution of the initial grasp geometry 212I or modify the initial grasp geometry 212I.

In some examples, the adjuster 230 determines to continue execution of the initial grasp geometry 212I. In other examples, the adjuster 230 determines to modify the initial grasp geometry 212I to generate a modified grasp geometry 212M. That is, after receiving the updated sensor data 134U, the adjuster 230 compares the initial grasp geometry 212I and the new candidate grasp geometry 212N and determines that it should modify the initial grasp geometry 212I. For example, when the updated sensor data 134U indicates a foreign object at or near the target object, the adjuster 230 determines the new candidate grasp geometry 212N includes a higher likelihood of success to grasp the target object than the initial grasp geometry 212I. In another example, based on the updated sensor data 134U, the adjuster 230 determines the new candidate grasp geometry 212N includes a shorter grasp execution time than the initial grasp geometry 212I. The adjuster 230 may modify the initial grasp geometry 212I by adjusting one or more degrees of freedom to match or more closely match characteristics of the new candidate grasp geometry 212N. In some implementations, the adjuster 230 modifies the initial grasp geometry 212I by discarding the initial grasp geometry 212I and executing the new candidate grasp geometry 212N. After modifying the initial grasp geometry 212I, the adjuster 230 sends the modified grasp geometry 212M to the control system 170 to instruct the robot 100 to execute the modified grasp geometry 212M. When the adjuster 230 determines that the initial grasp geometry 212I should continue being executed, the adjuster 230 does not send the modified grasp geometry 212M to the control system 170.

Referring now to FIG. 2B, in some implementations, the grasp geometry generator 210 generates a plurality of candidate grasp geometries 212, 212a-n based on the selected target object within the grasp area. In particular, the grasp geometry generator 210 generates multiple candidate grasp geometries 212 and the grasping system 200 determines which of the multiple candidate grasp geometries 212 the robot 100 should use to grasp the target object. In these implementations, the grasping system 200 includes a scorer 240 that assigns a grasping score 242 to each of the plurality of candidate grasp geometries 212. The grasping score 242 indicates an estimated or projected likelihood of success that the candidate grasp geometry 212 will successfully grasp the target object. That is, based on the selected target object, sensor data 134, and the grasp area, the grasp geometry generator 210 generates a plurality of grasp geometries 212 to grasp the target object. Here, the grasp geometry generator 210 sends each of the plurality of candidate grasp geometries 212 to the scorer 240. For each candidate grasp geometry 212 of the plurality of candidate grasp geometries 212, the scorer 240 determines a grasping score 242 that represents the candidate grasp geometry's capability to grasp the target object. The scorer 240 sends each grasping score 242 that corresponds to the respective candidate grasp geometry 212 of the plurality of candidate grasp geometries 212 to the selector 220. The generator 210 may generate a plurality of grasp geometries 212 because there are a number of pose permutations possible that enable the end-effector 150 to grasp some portion of the target object. For instance, the end-effector 150 may approach and/or grasp the target object from a particular direction or movement vector in 3D space or at a particular orientation (e.g., pitch, roll, or yaw). In other words, since the end-effector 150 may have multiple degrees of freedom at its disposal to affect the manner in which the end-effector 150 grasps the target object, the generator 210 may generate some number of these permutations as candidate grasp geometries 212.

In some configurations, there may be such a large number of potential candidate grasp geometries 212 that the generator 210 may work in conjunction with the selector 220 to generate an N-best number of grasp geometries 212 at a particular instance of time. In some implementations, the generator 210 is preconfigured to generate a maximum number of candidate grasp geometries 212 at any particular instant in time. In some examples, the number of grasp geometries 212 may be reduced, discounted, or decayed based on the relative timing of when the generator 210 generates the grasp geometries 212. For example, the generator 210 may generate a large number of grasp geometries 212 to form the initial grasp geometry 212I at a first instance of time, but then, at a second instance of time, the generator 210 may be configured to generate a smaller number of grasp geometries 212 while the robotic manipulator is executing the initial grasp geometry 212I.

The selector 220 is configured to select the respective candidate grasp geometry 212 with a greatest grasping score 242 as a grasp geometry 212 for the robot 100 to use to grasp the target object. The grasping score 242 may be generated by a scoring algorithm that accounts for different factors that identify an overall performance for a given grasping geometry 212. These factors may be preconfigured or designed by the user 12 of the robot 100. Some examples of factors that may contribute to the grasping score 242 include a speed to grasp the target object (e.g., a time to grasp the object), a degree of complication for the particular grasp, the degree of change from the current pose of the end-effector 150 to the grasping pose of the end-effector 150, the engagement of the grasp geometry 212 with the target object (e.g., engagement location relative to the centroid of the target object), the amount of torque the target object may be estimated to contribute, the amount of force or direction of force that the end-effector 150 imparts on the target object, etc. When determining the grasping score 242, the factors that influence the score 242 may also be weighted to stress an importance of one factor over another factor. For instance, if the target object has been classified as a fragile object, the scoring algorithm may discount the speed of the grasp to ensure the fragile object is less likely to be damaged. Based on some number of these factors, the grasping score 242 may generally indicate an efficiency, execution time, likelihood of success, etc. of a grasp geometry. In some examples, the selector 220 selects the candidate grasp geometry 212 from the plurality of candidate grasp geometries 212 when the grasping score 242 satisfies a grasping score threshold (e.g., when the grasping score 242 exceeds a value set as the grasping score threshold). As an example, the selector 220 receives three candidate grasp geometries 212 that include grasping scores 242 of 0.6, 0.4, and 0.8. In this example, the selector 220 determines the candidate grasp geometry 212 with the grasping score 0.8 has the highest likelihood to successfully grasp the target object. The selector 220 sends the selected candidate grasp geometry 212 (e.g., initial grasp geometry 212I) from the plurality of candidate grasp geometries 212 to the control system 170. The control system 170 instructs the robot 100 to execute the candidate grasp geometry 212 with the grasping score 242 of 0.8 as initial grasp geometry 212I.

The grasping system 200 sends the initial grasp geometry 212I to the control system 170 to initiate a sequence of movements to grasp the target object according to the initial grasp geometry 212I. In other words, to execute the initial grasp geometry 212I, the control system 170 instructs the arm 126 to move from an initial pose of the arm 126 to a grasping pose designated by the initial grasping geometry 212I. Here, the initial pose of the arm 126 refers to the pose or state of the arm 126 when the controller 20 received the input from the user 12 selecting the target object to be grasped by the end-effector 150 of the arm 126. In this respect, the initial grasp geometry 212I may be based on the initial pose for the end-effector 150 of the robotic manipulator. For instance, when the sensor 132 providing the image to the user 12 at the controller 20 is from a sensor 132 at the end-effector 150, the field of view $F_V$ of the sensor 132 associated with the end-effector 150 would be used to define the initial grasp geometry 212I and that field of view $F_V$ is based on the initial pose of the arm 126.

In some implementations, the grasping system 200 determines a plurality of new candidate grasp geometries 212N after the robot 100 begins execution on the initial grasp geometry 212I. That is, while the end-effector 150 of the robotic manipulator moves to grasp the target object based on the initial grasp geometry 212I the sensor system 130 receives updated sensor data 134U for a second pose of the end-effector 150 of the robotic manipulator. The sensor system 130 sends the updated sensor data 134U to the grasping system 200. The grasp geometry generator 210 determines a new set of candidate grasp geometries 212N based on the updated sensor data 134. The new set of candidate grasp geometries 212N may include any number of new candidate grasp geometries 212N. The grasp geometry generator 210 sends each new candidate grasp geometry 212N to the scorer 240.

The scorer 240 that scores the new candidate grasp geometry 212N may be the same scorer 240 used to score the candidate grasp geometries 212 that resulted in the initial grasp geometry 212I or a different scorer 240 dedicated to scoring new candidate grasp geometries 212N. In either case, the scorer 240 assigns a grasping score 242 to each new candidate grasp geometry 212N of the new set of candidate grasp geometries 212N. That is, the grasp geometry generator 210 sends the plurality of new candidate grasp geometries 212N to the scorer 240 that determines the grasping score 242 for each of the plurality of new candidate grasp geometries 212N. The scorer 240 sends the grasping score 242 for each respective new candidate grasp geometry 212N to the adjuster 230. In some examples, the scorer 240 sends only the highest grasping score 242 from the plurality of new candidate grasp geometries 212N. The adjuster 230 determines whether a respective grasp geometry 212 from the new set of candidate grasp geometries 212N includes a corresponding grasping score 242 that exceeds the grasping score 242 of the initial grasp geometry 212I (i.e., a score 242 that indicates a candidate grasp geometry 212N is better than the initial grasp geometry 212I). That is, the adjuster 230 receives the updated sensor data 134U and the respective grasping score 242 for the initial grasp geometry 212I and for each new candidate grasp geometry 212N.

In some implementations, when the corresponding grasping score 242 of the new candidate grasp geometries 212N exceeds the grasping score 242 of the initial grasp geometry 212I, the adjuster 230 modifies the initial grasp geometry 212I based on the respective candidate grasp geometry 212N from the new set of candidate grasp geometries 212N. For example, the robot 100 begins execution of the initial grasp geometry 212I with a grasping score of 0.8. After the robot 100 begins execution of the initial grasp geometry 212I, the grasp geometry generator 210 receives updated sensor data 134U that corresponds to the current field of view $F_V$ of the one or more sensors 132. The grasp geometry generator 210 generates a plurality of new candidate grasp geometries 212N based on the updated sensor data 134. In this example, the adjuster 230 receives the initial grasp geometry 212I with the grasping score 242 of 0.8 and receives a new candidate grasp geometry 212N with a grasping score 242 of 0.85. Here, the adjuster 230 determines the grasping score 242 (e.g., grasping score 242 of 0.85) for the new candidate grasp geometry 212N exceeds the grasping score 242 (e.g., grasping score 242 of 0.8) of the initial grasp geometry 212I and modifies the initial grasp geometry 212I. As state previously, this modification may make some form of adjustment to the initial grasp geometry 212I or complete replacement of the initial grasp geometry 212I with the new candidate grasp geometry 212N.

In some implementations, the adjuster 230 only modifies the initial grasp geometry 212I when the grasping score 242 of the new candidate grasp geometry 212N exceeds the score 242 of the initial grasp geometry 212I by a threshold. For example, the adjuster 230 only modifies the initial grasp geometry 212I when the grasping score 242 of the new candidate grasp geometry 212N exceeds the grasping score 242 of the initial grasp geometry 212I by a margin of 0.1. In this example, when the grasping score 242 of the initial grasp geometry 212I is 0.6 and the grasping score 242 of the new candidate grasp geometry 212N is 0.65, the adjuster 230 determines the grasping score 242 of the new candidate grasp geometry 212N does not exceed the grasping score 242 of the initial grasp geometry 212I by the threshold (e.g., 0.1). Here, even though the grasping score 242 of the new candidate grasp geometry 212N exceeds the grasping score 242 of the initial grasp geometry 212I, the robot 100 continues execution of the initial grasp geometry 212I. Stated differently, the margin of difference between grasping scores 242 may not justify the change in grasp geometries 212 even though a newer grasp geometry 212 has a higher score 242.

Figure 2C:
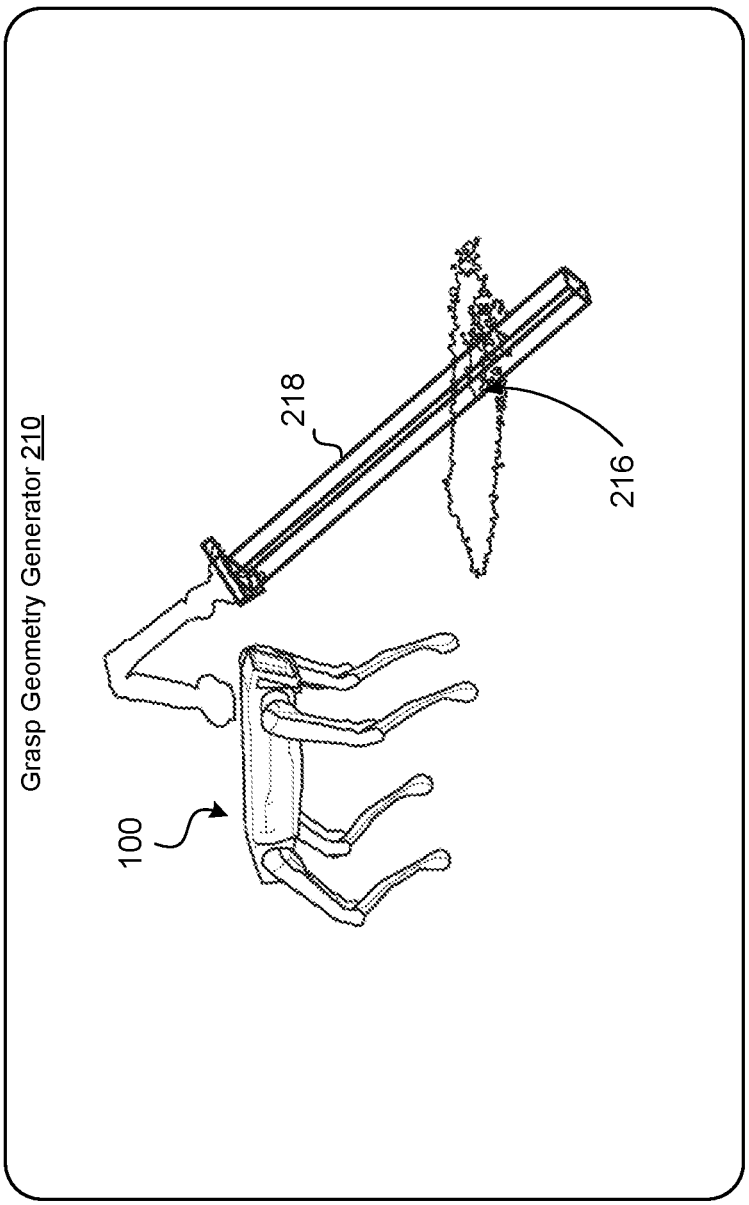

Referring now to FIG. 2C, in some examples, the grasp geometry generator 210 generates the grasp area 216. By generating the grasp area 216, the grasp geometry generator 210 translates the user selected two-dimensional area of interest (e.g., selected target object) into the grasp area 216 in the three-dimensional point cloud of sensor data 134. Specifically, the generation of the grasp area 216 allows the user 12 to interact with the two-dimensional image to instruct the robot 100 to perform an action in the three-dimensional environment 10. The grasp geometry generator 210 receives the user-selected target object from the UI 300 and sensor data 134 (e.g., three-dimensional point cloud). The user 12 selects the target object on the two-dimensional image on the UI 300 that corresponds to the three-dimensional point cloud of data 134 for the field of view $F_V$ of the robot 100. The grasp geometry generator 210 projects a plurality of rays from the selected target object from the two-dimensional image onto the three-dimensional point cloud of sensor data 134. The grasp area 216 therefore corresponds to the area formed by the intersection of the projected rays and the three-dimensional point cloud of sensor data 134

In particular, the grasp geometry generator 210 projects the plurality of rays from one or more pixels of the selected target object. Each ray of the plurality of rays projected from the two-dimensional image to the three-dimensional point cloud represents a pixel of the selected target object. The collection of the plurality of rays in the three-dimensional point cloud represents the grasp area 216. By projecting a ray for each pixel from the selected target object, the grasp geometry generator 210 translates the two-dimensional area of interest for the user 12 (e.g., selected target object) to the three-dimensional grasp area 216. Stated differently, the grasp area 216 designates a three-dimensional area that includes the target object such that the grasping system 200 may generate a grasp geometry 212 to grasp the three-dimensional target object within the grasp area 216. This means that the grasp area 216 designates an area of interest for the robotic manipulator to grasp. From this identified grasp area 216, the grasp geometry generator 210 may use the sensor data 134 within the boundaries of the identified grasp area 216 to understand the target object (e.g., the contour of the target object represented by the 3D point cloud sensor data 134) and to determine the grasp geometry 212.

In some examples, instructing the end-effector 150 of the robotic manipulator to grasp the target object within the grasp area 216 based on the grasp geometry 212 includes the one or more controllers 172 instructing the body 110 of the robot 100 to pitch toward the target object. That is, the one or more controllers 172 may instruct both the end-effector 150 of the robot 100 to maneuver towards the target object and the body 110 of the robot 100 to pitch towards the target object. By instructing both the end-effector 150 and the body 110, the robot 100 may generate more degrees of freedom that the end-effector 150 of the robotic manipulator can access.

In other examples, the one or more controllers 172 instruct a first leg 120 of the robot 100 to rotate an upper member $122_U$ of the first leg 120 about a knee joint $J_k$ towards a lower member $122_L$ of the first leg 120. For example, the one or more controllers 172 instructs each leg 120 of the robot 100 to rotate the upper member $122_U$ of the leg about the knee joint $J_k$ towards the lower member $122_L$ to lower the body 110 of the robot 100. In this example, when the one or more controllers 172 instruct each leg 120 of the robot 100, the body 110 of the robot 100 lowers while the pitch of the body 110 remains constant. In another example, the one or more controllers 172 instruct a subset of the legs 120 of the robot 100 to rotate the upper member $122_U$ of the leg 120 about the knee joint $J_k$ towards the lower member $122_L$. Here, the body 110 of the robot 100 may pitch towards the target object while the body 110 of the robot lowers towards the ground surface 14.

FIG. 3 is a flowchart of an example arrangement of operations for a method 500 for supervised autonomous grasping. The method 500 may be a computer-implemented method executed by data processing hardware 142 of the robot, which causes the data processing hardware 142 to perform operations. The method 500, at operation 502, includes receiving a three-dimensional point cloud of sensor data 134 for an area within an environment 10 about the robot 100. The method 500, at operation 504, includes receiving, from a user 12 of the robot 100, a user input selecting a target object represented in an image that corresponds to the area. The target object selected by the user input corresponds to a respective object for an end-effector 150 of a robotic manipulator of the robot 100 to grasp. The method 500, at operation 506, includes generating a grasp area 216 for the end-effector 150 of the robotic manipulator by projecting a plurality of rays 218 from the selected target object of the image onto the three-dimensional point cloud of sensor data 134. The method 500, at operation 508, includes determining a grasp geometry 212 for the robotic manipulator to grasp the target object within the grasp area 216. The method 500, at operation 510, includes instructing the end-effector 150 of the robotic manipulator to grasp the target object within the grasp area 216 based on the grasp geometry 212.

Figure 4:
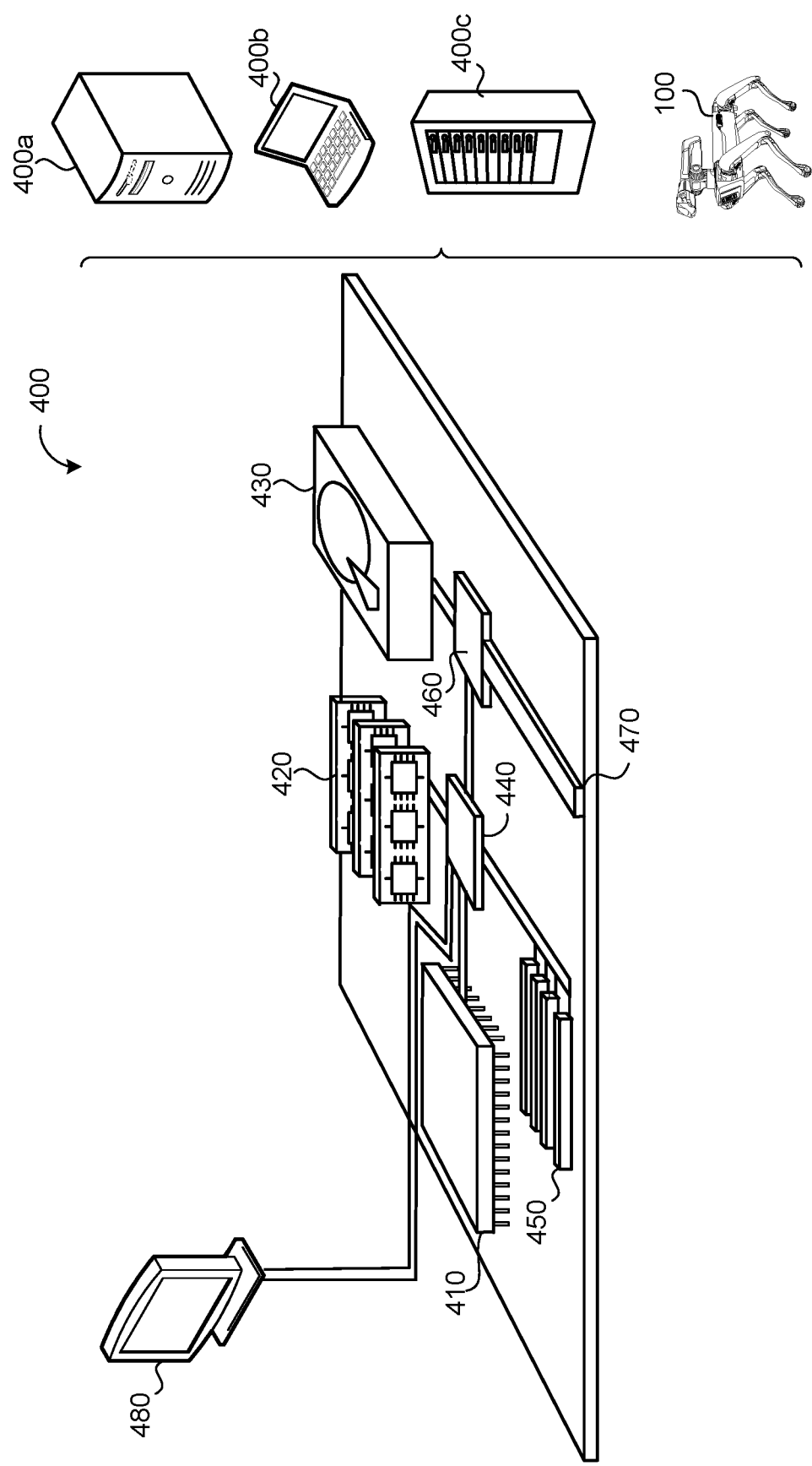
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a robot causes the data processing hardware to perform operations comprising:
    receiving a three-dimensional point cloud of initial sensor data for a space within an environment about the robot;
    receiving a selection input indicating a user-selection of a target object represented in an image corresponding to the space, the target object for grasping by an end-effector of a robotic manipulator of the robot;
    generating a grasp region for the end-effector of the robotic manipulator by projecting a plurality of rays from the selected target object of the image onto the three-dimensional point cloud of initial sensor data;

determining an initial grasp geometry for the robotic manipulator to grasp the target object within the grasp region based on an initial pose for the end-effector of the robotic manipulator;

instructing the end-effector of the robotic manipulator to grasp the target object within the grasp region based on the initial grasp geometry;

receiving updated sensor data for a second pose of the end-effector of the robotic manipulator in response to the end-effector of the robotic manipulator executing the initial grasp geometry, the updated sensor data including additional information about the target object indicating that a foreign object is present that obstructs the end-effector from grasping the target object based on the initial grasp geometry, the foreign object not included in the initial sensor data;

modifying the initial grasp geometry based on the additional information about the target object such that the foreign object does not obstruct the end-effector of the robotic manipulator from grasping the target object based on the modified initial grasp geometry; and controlling the end-effector of the robotic manipulator to grasp the target object within the grasp region based on the modified initial grasp geometry.

2. The method of claim 1, wherein determining the initial grasp geometry for the robotic manipulator to grasp the target object within the grasp region comprises:

generating a plurality of candidate grasp geometries based on the target object within the grasp region;

for each candidate grasp geometry of the plurality of candidate grasp geometries, determining a grasping score for grasping the target object, the grasping score indicating a likelihood of success for grasping the target object using the end-effector of the robotic manipulator based on the respective candidate grasp geometry; and selecting the respective candidate grasp geometry with a greatest grasping score as the initial grasp geometry designated to grasp the target object, the initial grasp geometry based on an initial pose for the end-effector of the robotic manipulator.

3. The method of claim 2, wherein the operations further comprise:

determining a new set of candidate grasping geometries based on the updated sensor data, each candidate grasping geometry of the new set of candidate grasping geometries comprising a respective grasping score; and determining that a respective candidate grasp geometry from the new set of candidate grasping geometries comprises a corresponding grasping score that exceeds the grasping score of the initial grasp geometry;

wherein modifying the initial grasp geometry is further based on the respective candidate grasp geometry from the new set of candidate grasping geometries.

4. The method of claim 1, wherein the operations further comprise receiving an end-effector constraint constraining one or more degrees of freedom for the end-effector of the robotic manipulator to grasp the target object.

5. The method of claim 1, wherein the target object represented in the image corresponding to the space corresponds to an object classified by a machine learning algorithm.

6. The method of claim 1, wherein the operations further comprise:

receiving the image corresponding to the space; and classifying graspable objects within the received image using a machine learning object classification algorithm.

7. The method of claim 1, wherein instructing the end-effector of the robotic manipulator to grasp the target object within the grasp region based on the modified initial grasp geometry comprises:

instructing a body of the robot to pitch toward the target object; or instructing a first leg of the robot to rotate an upper member of the first leg about a knee joint towards a lower member of the first leg.

8. The method of claim 1, wherein receiving the selection input occurs at a user device in remote communication with the data processing hardware of the robot.

9. The method of claim 1, wherein the operations further comprise:

receiving the image corresponding to the space; and calibrating the received image.

10. The method of claim 1, wherein the end-effector comprises a gripper having a movable jaw and a fixed jaw, the movable jaw configured to move relative to the fixed jaw to move between an open position for the gripper and a closed position for the gripper.

11. The method of claim 1, wherein the robotic manipulator comprises one or more sensors mounted at or near the end-effector to capture the initial sensor data defining the three-dimensional point cloud for the space within the environment about the robot.

12. A robot comprising:

a body;

a plurality of legs coupled to the body;

a robotic manipulator coupled to the body, the robotic manipulator comprising an end-effector configured to grasp objects within an environment about the robot;

data processing hardware in communication with the robotic manipulator; and memory hardware in communication with the data processing hardware, the memory hardware storing instructions that when executed on the data processing hardware cause the data processing hardware to perform operations comprising:

receiving a three-dimensional point cloud of initial sensor data for a space within the environment about the robot;

receiving, from a user of the robot, a selection input indicating a user-selection of a target object represented in an image corresponding to the space, the target object for grasping by the end-effector of the robotic manipulator;

generating a grasp region for the end-effector of the robotic manipulator by projecting a plurality of rays from the selected target object of the image onto the three-dimensional point cloud of initial sensor data;

determining an initial grasp geometry for the robotic manipulator to grasp the target object within the grasp region based on an initial pose for the end-effector of the robotic manipulator;

instructing the end-effector of the robotic manipulator to grasp the target object within the grasp region based on the initial grasp geometry;

receiving updated sensor data for a second pose of the end-effector of the robotic manipulator in response to the end-effector of the robotic manipulator executing the initial grasp geometry, the updated sensor data including additional information about the target object indicating that a foreign object is present that obstructs the end-effector from grasping the target object based on the initial grasp geometry, the foreign object not included in the initial sensor data;

modifying the initial grasp geometry based on the additional information about the target object such that the foreign object does not obstruct the end-effector of the robotic manipulator from grasping the target object based on the modified initial grasp geometry; and controlling the end-effector of the robotic manipulator to grasp the target object within the grasp region based on the modified initial grasp geometry.

13. The robot of claim 12, wherein determining the initial grasp geometry for the robotic manipulator to grasp the target object within the grasp region comprises:

generating a plurality of candidate grasp geometries based on the target object within the grasp region;

for each candidate grasp geometry of the plurality of candidate grasp geometries, determining a grasping score for grasping the target object, the grasping score indicating a likelihood of success for grasping the target object using the end-effector of the robotic manipulator based on the respective candidate grasp geometry; and selecting the respective candidate grasp geometry with a greatest grasping score as the initial grasp geometry designated to grasp the target object, the initial grasp geometry based on an initial pose for the end-effector of the robotic manipulator.

14. The robot of claim 13, wherein the operations further comprise:

determining a new set of candidate grasping geometries based on the updated sensor data, each candidate grasping geometry of the new set of candidate grasping geometries comprising a respective grasping score; and determining that a respective candidate grasp geometry from the new set of candidate grasping geometries comprises a corresponding grasping score that exceeds the grasping score of the initial grasp geometry;

wherein modifying the initial grasping geometry is further based on the respective candidate grasp geometry from the new set of candidate grasp geometries.

15. The robot of claim 12, wherein the operations further comprise receiving an end-effector constraint constraining one or more degrees of freedom for the end-effector of the robotic manipulator to grasp the target object.

16. The robot of claim 12, wherein the target object represented in the image corresponding to the space corresponds to an object classified by a machine learning algorithm.

17. The robot of claim 12, wherein the operations further comprise:

receiving the image corresponding to the space; and classifying graspable objects within the received image using a machine learning object classification algorithm.

18. The robot of claim 12, wherein instructing the end-effector of the robotic manipulator to grasp the target object within the grasp region based on the modified initial grasp geometry comprises:

instructing the body of the robot to pitch toward the target object; or instructing a first leg of the plurality of legs of the robot to rotate an upper member of the first leg about a knee joint towards a lower member of the first leg.

19. The robot of claim 12, wherein receiving the selection input occurs at a user device in remote communication with the data processing hardware of the robot.

20. The robot of claim 12, wherein the operations further comprise:

receiving the image corresponding to the space; and calibrating the received image.

21. The robot of claim 12, wherein the end-effector comprises a gripper having a movable jaw and a fixed jaw, the movable jaw configured to move relative to the fixed jaw to move between an open position for the gripper and a closed position for the gripper.

22. The robot of claim 12, wherein the robotic manipulator comprises one or more sensors mounted at or near the end-effector to capture the initial sensor data defining the three-dimensional point cloud for the space within the environment about the robot.

* * * * *